United States Patent [19]

Berger

[11] Patent Number: 4,531,167
[45] Date of Patent: Jul. 23, 1985

[54] SERVOWRITER SYSTEM FOR MAGNETIC DISC DRIVES

[75] Inventor: James K. Berger, Malibu, Calif.

[73] Assignee: Pioneer Research, Inc., Santa Monica, Calif.

[21] Appl. No.: 526,485

[22] Filed: Aug. 25, 1983

[51] Int. Cl.³ ............................ G11B 5/012; G11B 5/48
[52] U.S. Cl. ............................................ 360/77; 360/78
[58] Field of Search .................................... 360/77, 78

[56] References Cited

U.S. PATENT DOCUMENTS 4,371,902  2/1983  Baxter et al. ........................ 360/75

Primary Examiner—George G. Stellar
Attorney, Agent, or Firm—Keith D. Beecher

[57] ABSTRACT

A portable servowriter system for writing a closed clock track and servo tracks on one or more of the fixed discs of a fixed disc magnetic disc drive without the aid of a mechanical head positioner; and which is also capable of writing a closed clock track and servo tracks (either on a dedicated disc surface or of the embedded form) on one or more of the discs of a rotating disc magnetic disc drive with the aid of a mechanical positioner.

27 Claims, 9 Drawing Figures

FIG.3

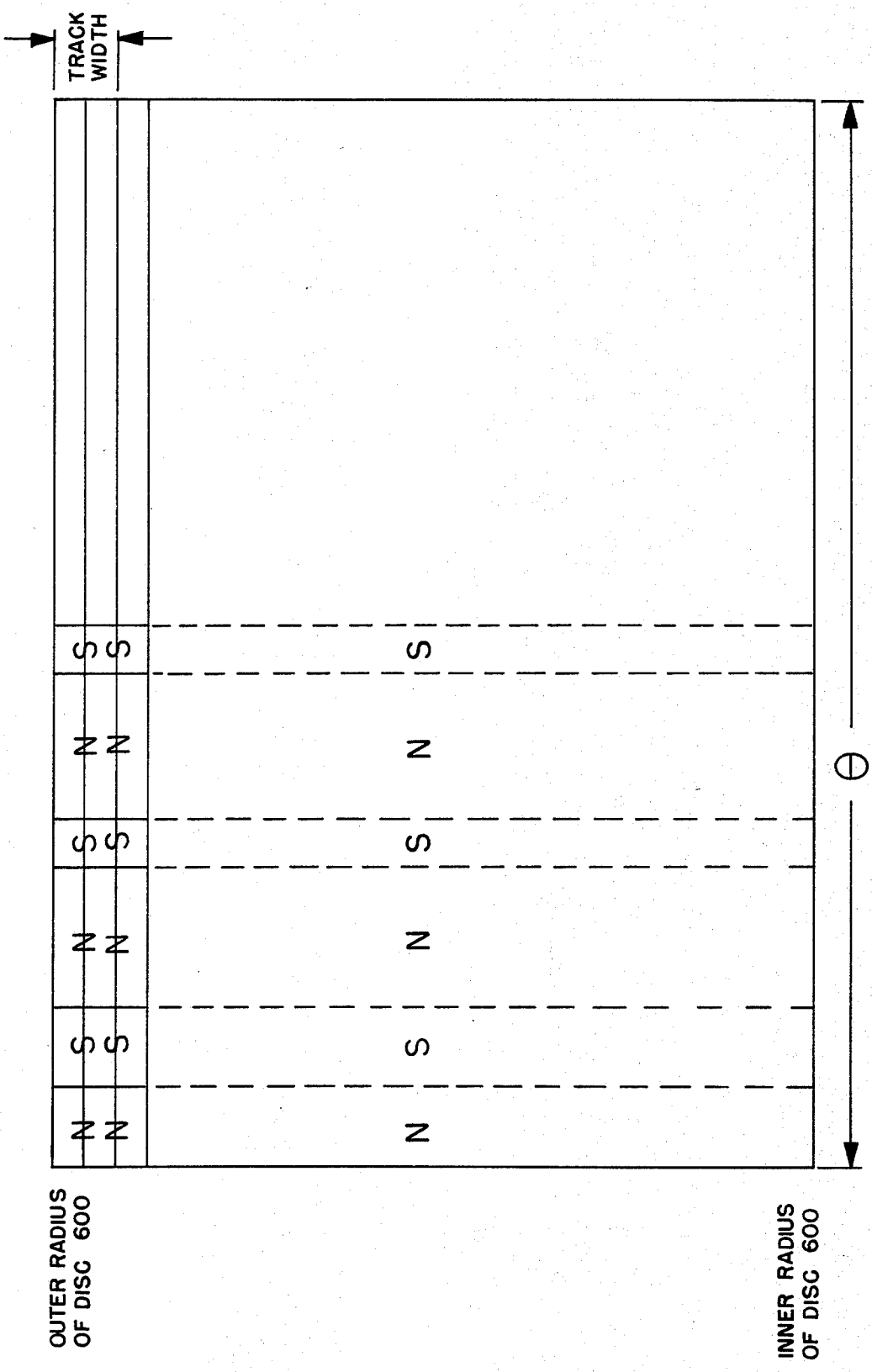

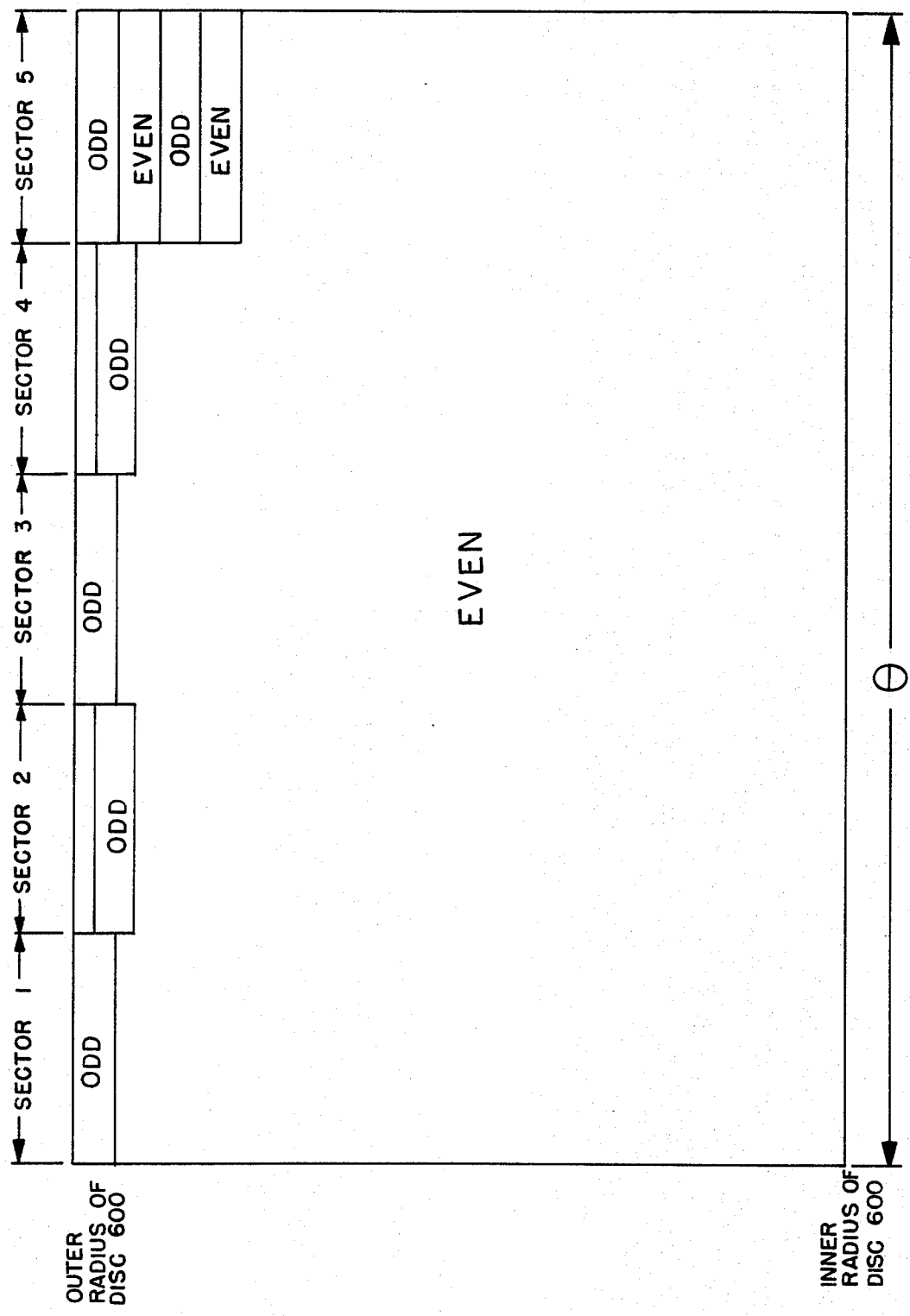

SERVOWRITER SYSTEM FOR MAGNETIC DISC DRIVES

BACKGROUND OF THE INVENTION

In the data processing art, data is usually stored in a magnetic disc drive in binary digital form on magnetic recording surfaces, such as the surfaces of a disc pack. The disc pack in one form includes a number of magnetic discs fastened to a rotatable hub in vertical spaced positions, with each disc having recording surfaces on both sides. The disc pack is constructed for use with a disc file unit which includes a motor for rotating the pack, and which also includes a bank of electromagnetic transducer heads mounted on a positioning mechanism which moves the transducer heads radially in unison from one radial track to another on the disc surfaces. Each transducer head in the head assembly is magnetically coupled to a different one of the disc recording surfaces, and each transducer head is adapted to record new data on the radial tracks on the associated surface, or to read data from the radial tracks on the surface under the control of appropriate electronic equipment.

As mentioned above, the binary data is recorded on the several surfaces of the magnetic discs in a circular track format, with each disc surface having a plurality of concentric tracks of data. In order to write or read data from any particular track on any particular disc surface, an appropriate mechanism is provided for setting the particular transducer in operative relationship with the particular track, and a servo system is also provided for maintaining the transducer centered on the track.

One type of magnetic disc drive has one or more disc surfaces for data storage; and one disc surface, usually near the center of the disc pack, which is dedicated to servo tracks exclusively. A special servo read head transducer reads the servo tracks on the dedicated surface. The associated servo system responds to the signals from the servo head to position the arm or carriage carrying the servo head so that the servo head is maintained directly over the correct servo tracks and, therefore, the data heads which are mounted on the same arm are correctly maintained in alignment with the corresponding data tracks.

Another type of drive has recently been developed which has embedded servo tracks that take the place of the dedicated servo tracks discussed above. Embedded servo tracks are written on the data surfaces of the disc pack. They are not continuous tracks, but they consist of bursts of servo information written between data sectors on each data track. Each data head reads data during the sector data time and reads servo information between successive sector data times. The servo information is sampled when that information is read by the particular data head, and is held during the sector data times.

The dedicated servo and embedded servo magnetic disc drives discussed above usually have movable discs which are rotatably driven about a particular axis of rotation, and transducers which are held on an arm or a carriage in a stationary position with respect to the discs, until the heads are moved by the arm or carriage from one radial track to another. Another type of magnetic disc drive has recently been developed using low flying heads and which are sealed to exclude dust particles. This latter type of disc drive is called a "Winchester" drive. The Winchester drives have remarkably high data storage capacity. In the Winchester drive the head carriage is positioned by a closed loop servo system.

All the servo tracks, either dedicated or embedded, operate in pairs. A data track location is defined as the center between a pair of servo tracks. The servo tracks of each pair are usually designated EVEN and ODD. In operation, the servo head in the dedicated servo type, or the corresponding data head in the embedded servo type, straddles the space between the EVEN and ODD servo tracks. The servo head operates to position the arm or carriage so that it reads equal amounts of even and odd information from the two servo tracks. If the drive has a dedicated servo surface, it is usual to obtain the write clock and index, and sometimes the sector marks, from the servo tracks. In the case of the embedded servos, the clock cannot be obtained from the servo tracks, because the servo tracks are not continuous. Therefore, in the case of the embedded servo tracks, a separate clock head and an associated closed master clock track must be provided in order to write the servo information on the disc. However, during normal operation a self-clocking data track is used and no separate clock is required.

Nearly all the servo tracks on magnetic disc drives, dedicated or embedded, are closed. That is, the information in the servo tracks has no gap or discontinuity at the origin. Therefore, the servo information in the servo tracks must be written from a master clock track which, likewise, is closed. Writing a closed master clock track on a magnetic disc of acceptable quality is extremely difficult. The system disclosed in U.S. Pat. No. 4,131,920 which issued Dec. 26, 1978 in the name of the present inventor is one of a very few systems which are available for that purpose.

In the case of magnetic disc drives with removable discs and dedicated servo surfaces, the precise mechanical position of the servo tracks is important. Each track must be written at precisely the correct radius to assure compatibility of discs between drives. Removable discs for drives of this type have dedicated servo surfaces recorded by special instruments which embody precise mechanical positioners, such as laser interferometers. One such instrument is disclosed, for example, in U.S. Pat. No. 4,068,268 which issued Jan. 10, 1978 to Tom Y. Idemoto et al.

In the case of magnetic disc drives with non-removable discs, or using embedded servos, the requirement for the mechanical position of the tracks is less severe than in the case of the drives with the removable discs. Presently, the servo tracks for the magnetic disc drives with non-removable discs are also written using mechanical positioners, but of a less expensive type than required for the removable disc type of drive with the dedicated servo surface.

In either case, the servo writing procedure is to position the arm or carriage mechanically at the extreme inside track or outside track, and then to write one of the two servo tracks, and then to move the arm or carriage one track width, and write the other servo track, and to repeat this process over and over again until all the servo tracks have been written. Although the procedure is accomplished automatically, as described in the Idemoto et al patent, it is slow and requires bulky and expensive equipment.

The system disclosed in the Berger U.S. Pat. No. 4,131,920 may be considered as a basis for a unit for writing the servo tracks. This is because a basic requirement for any such unit is the ability to produce a closed master clock track. However, the system described in the Berger patent does not have suitable internal logic or operating controls to operate automatically in order to write a series of servo tracks, and to position the servo head between each writing. Moreover, it does not have sufficient pattern selection capability to write the servo information used in most magnetic disc drives, since eight patterns are usually required, and the Berger system can select only six.

The system of the present invention finds particular utility in conjunction with the "Winchester" magnetic disc drive described above using embedded servo tracks. The system is capable of writing servo tracks on the Winchester magnetic disc drives automatically and without the use of mechanical positioners. This means that the servo tracks may be written without breaking the seal of the Winchester drive, and the operation may be performed without the need for a clean room enviroment. However, the system of the invention, as mentioned above, is also capable of operating in conjunction with precision mechanical positioners for writing servo tracks on the movable disc dedicated servo surface magnetic disc drives of the Winchester and other types. The system of the invention can be portable, and it is capable of writing a closed clock track of high quality. The system has a pattern storage capability, as well as the controls and sequencing necessary to write servo tracks automatically. Moreover, the system has the capacity to store internally a large number of different servo patterns, which may be selected by the operator. These patterns are stored in programmable read-only memories (PROMS) which are easily programmable for new requirements.

SUMMARY OF THE INVENTION

A self-contained servowriter system for writing servo tracks on magnetic disc drives is provided, particularly on magnetic discs with dedicated servo surfaces or embedded servo tracks. The servowriter system of the invention has universal application and may be portable. Its unique features include its ability to record an extremely accurate closed clock track for reference during servo writing, and its ability to write servo tracks on the disc. Although the system is particularly suited for automatically writing servo tracks on the Winchester-type of disc drive on a production basis, without the need for mechanical positioners, it includes appropriate interface circuitry having a programmable servo format and positioning constants, so that the system may be used in conjunction with a wide variety of rotatable disc magnetic disc drives.

BRIEF DESCRIPTION OF THE DRAWINGS

FIG. 3 is a logic diagram of a microprocessor control unit included in the system of FIG. 2;

FIGS. 6-9 are schematic diagrams useful in explaining the operation of the system of the invention.

DETAILED DESCRIPTION OF THE ILLUSTRATED EMBODIMENT

Figure 1:
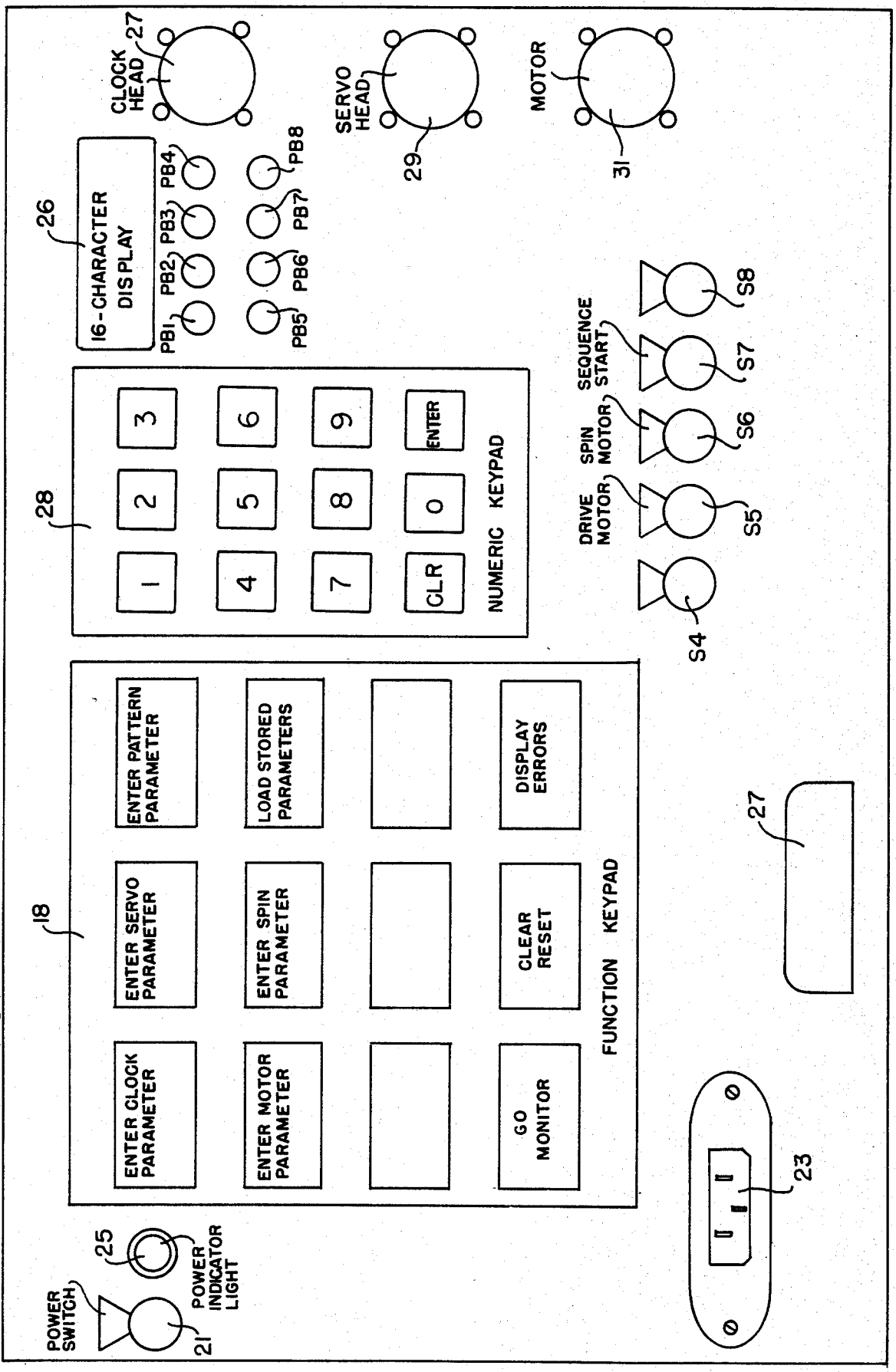
FIG. 1 is a representation of the control panel of a constructed embodiment of the invention.

As shown in FIG. 1, the control panel of the unit includes a data entry or function key pad 18. The key pad 18 includes a number of keys designated "ENTER CLOCK PARAMETER", "ENTER MODE PARAMETER", "ENTER PATTERN PARAMETER", "ENTER MOTOR PARAMETER", "ENTER SPIN PARAMETER", "LOAD STORED PARAMETERS", "GO MONITOR", "CLEAR RESET", "DISPLAY ERRORS".

The display panel also includes a numeric key pad 28 which includes keys 1-0, and "CLEAR" and "ENTER". A 16-character display 26 is also mounted on the front panel. A number of illuminated pushbutton switches designated PB1-PB8 are mounted on the panel; and a number of toggle switches S5-S8. The toggle switch S5 is designated "drive motor", the toggle switch S6 is designated "spin motor", and the toggle switch S7 is designated "sequence start".

When any of the pushbuttons PB1-PB8 is depressed, it is illuminated, and it remains illuminated until the function corresponding to that pushbutton is completed. At that time, the particular pushbutton goes into a flashing mode, indicating to the operator that the next pushbutton may be pressed. When the start sequence switch S7 is operated, each of the pushbuttons PB1-PB8 in turn is actuated, and each is illuminated in sequence, to indicate to the operator the status of the sequence of operations initiated by the operation of switch S7.

The front panel also includes a power switch 21, a power indicator light 25, and a power socket 23. A connector 27 is also provided to permit the system to be connected to a cathode-ray tube terminal.

Figure 2:
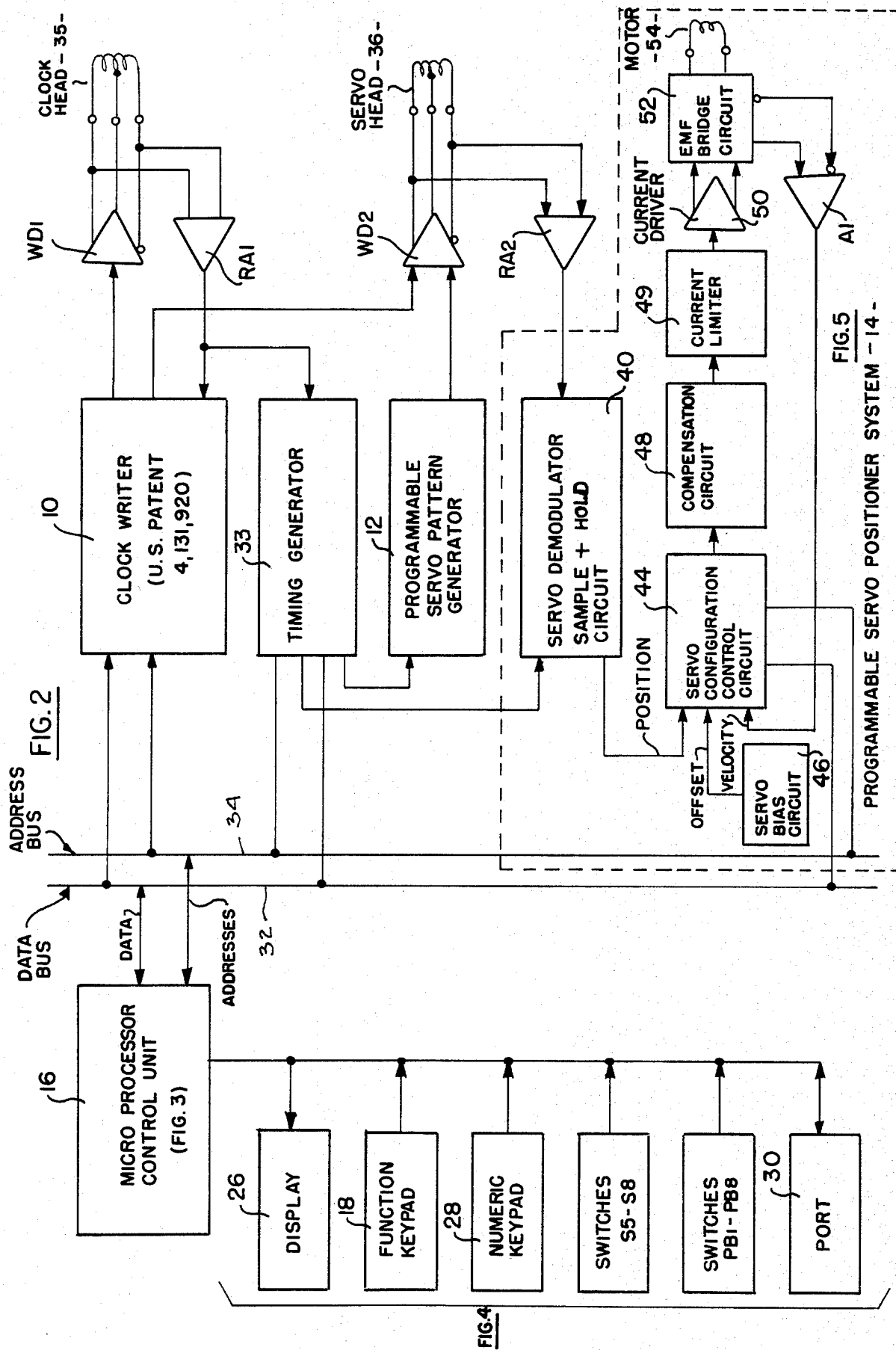
FIG. 2 is a block diagram of the constructed embodiment.

The system of the invention comprises four functional elements shown in FIG. 2 which are integrated both physically and operationally. These elements include a precision clockwriter 10, a programmable servo pattern generator 12, a programmable servo positioner system 14, and a microprocessor control unit 16. The programmable servo pattern generator is described and claimed in Copending application Ser. No. (K-2800) filed Feb. 27, 1984 in the name of Dan Nay and assigned to the present Assignee.

The precision clockwriter 10 incorporated in the system of the invention is similar in function to the clockwriter described in U.S. Pat. No. 4,131,920 and which is presently commercialy available under the designation PM2390. The clockwriter is capable of writing a closed clock with unmeasurable closure error and negligible frequency modulation. In operation, an origin pulse is first written by a reference clock head, and then a scratch clock is written by any convenient servo head at one-eleventh of the final clock frequency. Finally, a precision clock is written by the reference head. The precision clock includes an encoded clock index. The reference clock writing operation takes less than a minute at 3600 rpm.

The programmable servo pattern generator 12 stores servo patterns in a convenient user-oriented format. The format is algorithmic, so that only 360 data bytes are needed to descibe almost any arbitrary servo pattern. User defined patterns are stored internally in the servowriter system of the invention in a programmable memory, and called as required. Patterns may be entered on the data entry key pad 18 (FIG. 1) of the clockwriter, or loaded from another device through an interface circuit.

The programmable servo positioner 14 is used to control the position of the arm or carriage of the disc drive during servowriting. The positioner has an output driver 50 which connects directly to motor 54, which may be any two-wire actuator such as a torquer or voice coil. The maximum voltage and current of the output driver are programmable. The positioner input is compatible with the output of a standard SSI-104 or SSI-115 pre-amplifier, or other known linear head pre-amplifier, which is usually located on the arm or carriage being positioned by the positioner. No velocity input is required.

The programmable servo positioner has characteristics which differ from the positioning servo in the disc drive itself. The positioner holds the arm or carriage of the disc drive effectively motionless during the servo-writing operation, rather than tracking the eccentricity of the reference which is the normal function of the drive servo.

The technique by which the programmable servo positioner is able to find and hold the correct position for writing each servo track has many variations, the choice of which is influenced by whether the servo tracks are to be recorded on a dedicated surface, or are to be embedded in the data tracks; whether the disc drive has a permanent clock head; and other factors. The basic technique of the programmable servo positioner is a bootstrap procedure which is executed twice, once for calibration and once for effect. The total time required is usually much less than that which is customarily required if an external mechanical positioner is used. The positioner may include circuitry such as described in Copending application Ser. No. 367,358, which was filed Apr. 12, 1982, in the name of the present inventor, and which is assigned to the present assignee.

The microprocessor control unit 16, as shown in FIG. 2, is coupled to the sixteen-character display 26, to the key pads 18 and 28, to the toggle switches S5–S8, and to the pushbutton switches PB1–PB8. The microprocessor control unit is also connectd to a port 30. The microprocessor control unit is further connected to a data bus 32 and to an address bus 34 which connects the unit with the other components of the system. The two buses may be multiplexed into a single bus, as is the case in the system to be described in conjunction with FIGS. 3–5.

The entire operation of the servowriter system of the invention is automatic, and it is supervised by the microprocessor control unit 16. Once programmed, either manually from the front panel 20 (FIG. 1) of the unit embodying the system, or by calling programs stored in the programmable memory (EPROM) of the microprocessor control unit 16, the system will carry out the entire servowriting procedure without operator assistance. In case of difficulty where any step of the procedure fails to execute properly, operator feedback is provided in the form of messages appearing on an alphanumeric display.

All servo patterns are verified after writing. Flux reversals read from the disc being processed are verified both for position and amplitude according to criteria stored at the same time and in a similar format as the actual pattern data. Verification is usually effectuated on each track immediately after writing, so that another attempt can take place if a failure has occurred.

The system of the invention may have the following specifications, which are listed herein merely by way of example, and which are not intended to limit the concept of the system in any way.

| CLOCKWRITER CHARACTERISTICS: | |
| --- | --- |
| Flux Reversals/Track | 1,048,576 Max |
| Flux Reversals/Second | 24MFR/S Max |
| RPM | 500 Min |
| | 8000 Max |
| Memory Heads Req'd. | 2 Min |
| Interface | SSI-104 |
| | SSI-115 |
| | Custom |
| Write Current | 45 MA Max |
| Closure Error | Unmeasurable |
| Frequency Modulation | .003% Max |
| Bit-to-bit Jitter | 2NS Max |
| PATTERN GENERATOR/VERIFIER CHARACTERISTICS: | |
| FLUX Reversal Positions/Frame | 64 |
| Frame Types/Track | 8 Max |
| Frames/Sequence | 256 Max |
| Frames/Beginning Sequence | 256 Max |
| Frames/Ending Sequence | 256 Max |
| Track Types/Surface | 8 Max |
| Bytes/Track Description | 360 |
| Bytes Verification Description | 32 |
| Pattern Load/Entry | EPROM |
| | Keypad |
| | RS-232-C |
| SERVO POSITIONER CHARACTERISTICS: | |
| Output Interface | Bridge |
| | Full-wave |
| Output Voltage | 48V Max |
| Output Current | 4A Max |
| Input Interface | SSI-104 |
| | SSI-115 |
| | Custom |
| Servo Compensation | Programmable |
| Positioning Algorithm | Programmable |
| Track Spacing Accuracy | ±5 Microinch Max |
| Track Absolute Position | ±.001 Inch Max |
| MICROPROCESSOR CONTROLLER CHARACTERISTICS: | |
| Microprocessor Type | 8085 |
| EPROM Program Store | (4) 2732 |
| RAM | (4) 2114 |
| Communication Interface | RS-232-C |
| Panel Interface | Keypad |
| | Alphanumeric Display |
| COMBINED CHARACTERISTICS: | |
| Total Servowriting Time per Memory is Approximated by: | |
| T = 600N/S + 100 | T = Time, seconds |
| | N = Number of tracks |
| | S = Spindle RPM |
| Servowriter Dimensions | 18" × 12" × 24" |
| Servowriter Weight | 30 lbs |
| Power Requirements | 120/240 VAC |
| | 50–60 Hz |
| | 150 Watts |
| Option Slots | 4 Slots for |
| | Customer Options |
| Options Available | Spindle Speed Servo |
| | with 75W output driver |
| | Head Pre-Amp and |
| | Write Driver for |
| | Direct Head Interface |

The servowriter of the invention, in the embodiment to be described, has particular application in a data system ASP memory which comprises a sealed Winchester technology disc memory system having fixed discs and a removable disc-cartridge on the same spindle. The system includes one dedicated servo surface in the fixed disc assembly and in addition all the data tracks contain embedded servo information. The dedicated servo surface is used for clock, index, and other data, while the embedded servos are used for tracking position information. The servo tracks are written by providing a master disc cartridge having one fixed head and a dedicated servo surface.

The master disc cartridge is installed on the drive, and the servo surface of the drive and the embedded servos are written using clock and index information from the fixed head of the master cartridge, and by using positioning data from the dedicated servo surface of the master cartridge. Production cartridges are then made by installing them on a drive that has a servo surface written in the manner described above, and by positioning on the fixed servo surface and deriving the servo information for writing the embedded servo tracks of the cartridge from the same surface. In this manner, as many drives and cartridges as required can be written, all derived from one master cartridge.

Although it is essential that the servo positions in each drive have an operational mode which holds the arm steady and does not follow the eccentricity of the track from which it derives position information, and that sufficient logic be included in each drive to generate the required patterns, or at least re-clock the ones to be transferred, there may be reasons for not doing this.

Firstly, the servo which positions the arm for servo writing is different from the one which follows a track to read or write data. The latter must follow the eccentricity of the track from which it derives position information as closely as possible, whereas the former must not follow it at all. If the total eccentricity from all causes on the positioning track exceeds the track pitch, the positioning servo must find the true average track position even though sometimes the head is on totally even or totally odd information with respect to the dual servo tracks, and proportionality is lost. The electronics to accomplish this result is relatively complex, and adds to the cost of the drive.

Secondly, considerable logic is necessary to generate servo patterns for writing from the servo data read from another surface, or from a reconstituted clock.

Thirdly, if self-contained drive electronics is used to transfer servo patterns from one surface to another, there will almost certainly be no verification. The verification circuitry is analog, and does not lend itself to any sort of integration.

Fourthly, switching power amplifiers used for motor drive and arm drive may interfere with the read-while-writing process, and it may be necessary to drive the spindle motor and the arm actuator from linear amplifiers, both for electrical noise reasons and for improved accuracy without modulation. Lastly, a microprocessor is necessary to supervise the servo transfer operation.

The programmable servo positioner 14 included in the system of the invention is designed and intended to find and hold the true average position of an eccentric track even though the track goes out of the proportional range. The programmable pattern generator 12 included in the system of the invention is capable of generating all ASP patterns from a reconstituted clock. The generator 12 can reconstitute the clock from the servo data on the track being followed to a higher degree of accuracy than is generally possible in cost-effective drives.

Also included in the system is a timing generator 33. The clock writer 10 is coupled to clock head 35 through a write amplifier WD1 and through socket 27 in FIG. 1, and the clock head is coupled back to the clock writer 10 and to the timing generator 33 through socket 27 and through a read amplifier RA1. The clock writer 10 is also coupled through a write amplifier WD2 and through a socket 29 in FIG. 1 to servo head 36, and the servo head is coupled back through a socket 29 and through read amplifier RA2 to a servo demodulator sample and hold circuit 40 which is included in the programmable servo positioner 14.

Sample and hold circuit 40 is connected to a servo configuration control circuit 44. A servo bias circuit 46 is also connected to control circuit 44, and the control circuit 44 is connected to a compensation circuit 48. Compensation circuit 48 is connected through a limiter circuit 49, to a current driver stage 50 which, in turn, is connected to an EMF bridge circuit 52. The bridge circuit is connected through socket 31 of FIG. 1 to motor 54. The bridge circuit is also connected back through an amplifier A1 to the servo configuration circuit 44.

As stated above, clock writer 10 is similar to the unit disclosed in U.S. Pat. No. 4,131,920. The clock writer is controlled by the key pad 18 of FIG. 1, and also by the series of illuminated pushbutton switches PB1–PB8 in FIG. 1, these pushbutton switches being designated "WRITE ORIGIN PULSE", "WRITE SCRATCH CLOCK", "WRITE REFERENCE CLOCK", "INITIALIZE SURFACE", "WRITE BOOT", "WRITE SCRATCH SERVO", "WRITE SERVO".

The timing generator 33 and pattern generator 12 work together to adapt data to the proper format to be written on the servo discs of the disc drives of different manufacturers. These two generators comprise a collection of logic components, by which a description is generated of the particular track in which particular data is to be written, and the pattern generator then generates the bits corresponding to that particular pattern.

The servo demodulator circuit 40 is similar to the circuit illustrated and described in Copending application Ser. No. 367,358 referred to above. This circuit responds to servo signals derived from a disc of a disc drive being processed, and it generates a voltage corresponding to the position of the head associated with that disc for tracking purposes.

The servo configuration control circuit 44 controls the positioning motor 54 of the positioning arm of the disc drive being processed. This motor is usually of the voice coil type. The current driver 50 is a power driver stage for motor 54, and the EMF bridge circuit 52 measures the back EMF only of the voice coil motor to derive a signal corresponding to the velocity of the positioning arm. This velocity signal is amplified in amplifier A1 and introduced to the servo configuration control circuit 44. The compensation circuit 48 serves to filter out extraneous signals so as to render the servo system stable.

The feedback from amplifier A1 causes the arm to move in at a constant rate while writing, for example, the intermediate servo track. The configuration control circuit 44 may select a signal from the sample and hold circuit 40 to hold the arm stationary during alternate sectors and write in the intermediate sectors. To write even and odd servo information, the velocity feedback signal from amplifier A1 is selected by the servo configuration control circuit 44 and a signal from the sample and hold circuit 44 is also derived by circuit 44. The servo bias circuit 46 is selected to put an offset into the control. All the foregoing selections are controlled by the microprocessor control unit 16.

Figure 3:
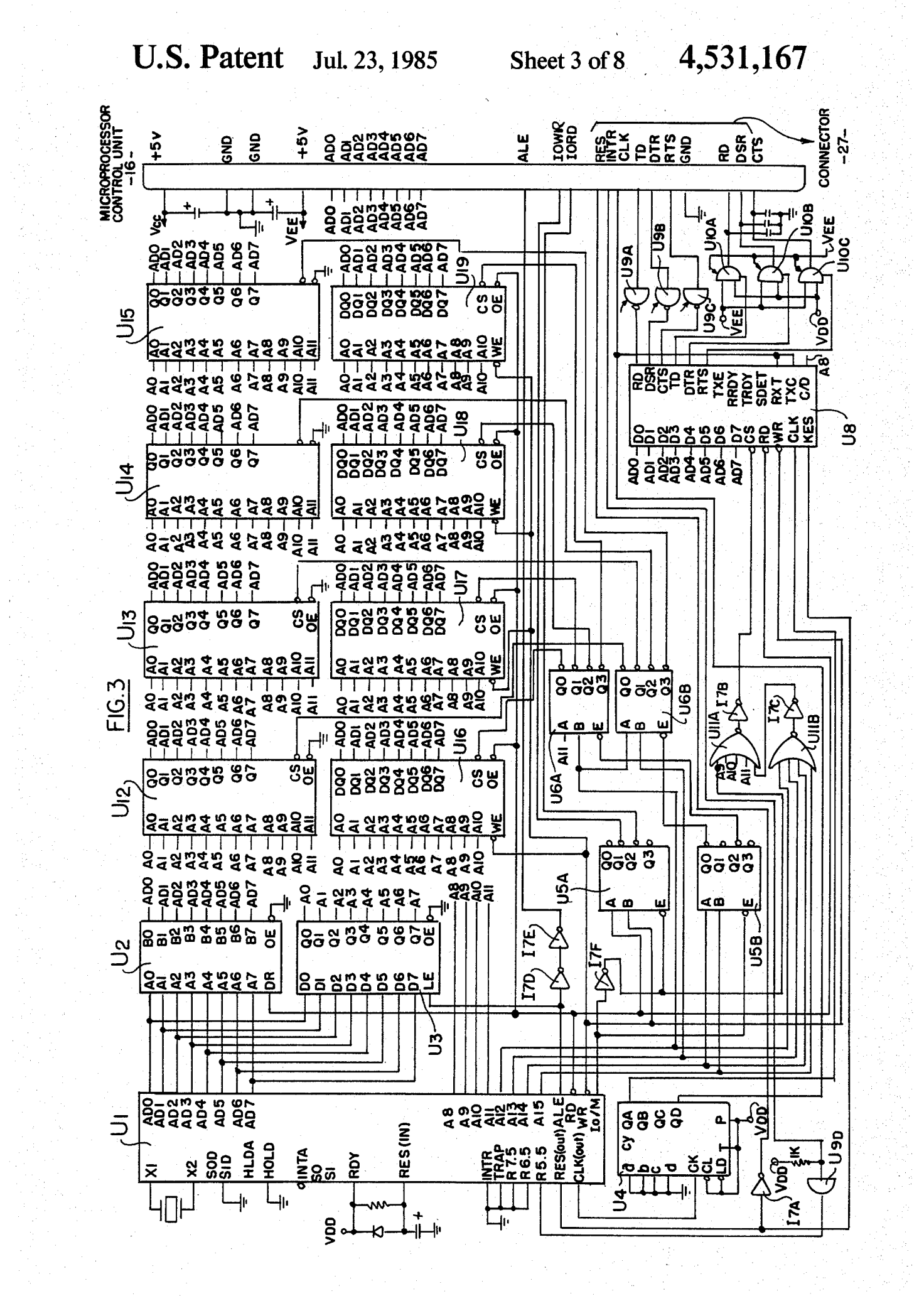

The microprocessor control unit 16 of FIG. 2 is shown in more detail in FIG. 3. The system includes a microprocessor U1 which may be of the type designated 8085A. Microprocessor U1 is connected to a bi-directional octal buffer U2 which serves to buffer the time-multiplexed data/address bus so that the microprocessor can drive the long lines to the memories of the system. The DR input to the buffer is the directional control. When DR is low data is fed from the bus into the microprocessor, and when DR is high data is fed from the microprocessor to the bus. Buffer U2 may be of the type designated 74LS245.

The system of FIG. 3 also includes an octal latch Ue which may be of the type designated 74LS373. As mentioned above, the address and data signals from microprocesosr U1 may be time multiplexed on a single bus. Accordingly, the address signals are placed on the bus during the first half of each command interval, and the data signals are placed on the bus during the second half. The latch U3 latches the address signals as they occur during the first half of the interval, and serves to introduce the address signals to the memories during the entire interval.

The LE input to latch U3 is the enable input which is derived from microprocessor U1. When LE is low the latch responds to address signals applied to its input terminals D0–D7. When LE is high, the address signals are latched and are available at the output terminals Q0–Q7 as address signals A0–A7.

The system of FIG. 3 also includes a number of erasable programmable read-only memories (RPROMs) U-12–U15, which may be of the type designated 2732; and it includes a number of random access memories (RAMs) U-16–U19 which may be of the type designated TMS4016. When the write enable (WE) input to any addressed RAM is low, data from the bus is read into the RAM. On the other hand, when WE is high, data from an addressed RAM is read to the bus.

A universal transmitter receiver (UART) integrated circuit U8 is also included in the system for converting serial data received from a terminal or remote computer into parallel form, and for converting parallel data from the system of FIG. 3 into serial format. Connection is made to the terxinal or remote computer through the connector 27 of FIG. 1. Specifically, integrated circuit U8 coverts parallel data from the system of FIG. 3 into serial data on output line TD, and it converts serial data received on input line RD into parallel data. Integrated circuit U8 may be of the type designated 8251A. The logic elements U9A, U9B, U9C and U9D connected to integrated circuit U8 may be of the type designated MC1489AL. Integrated circuits U10A, U10B and U10C, also connected to integrated circuit U8, are analog multiplexers which are used as line drivers, and are of the type designated CD 4053. Inverters 17A, 17B, 17C, 17D, 17E and 17F included in the sytem may be of the type designated 74LS04.

Integrated circuit U8 is selected by address decode circuitry made up of logic elements U11A and U11B, which may be of the type designated 74LS260. Integrated circuit U4, which may be of the type designated 74LS161, is a counter which serves as the BAUD rate clock for the serial interface. The counter U4 counts down the microprocessor clock to a frequency suitable for application to the integrated circuit U8. This frequency, for example, may be 153.6 KHz.

Integrated circuit U5B is a decoder which is part of an address decoding network, this network also including decoders U6A and U6B. These decoders together decode the address signals from the microprocessor U1 to select the EPROMs and RAMs U12–U19. Integrated circuits U5A, U5B, U6A and U6B may be of the type designated 74LS139.

Figure 4:
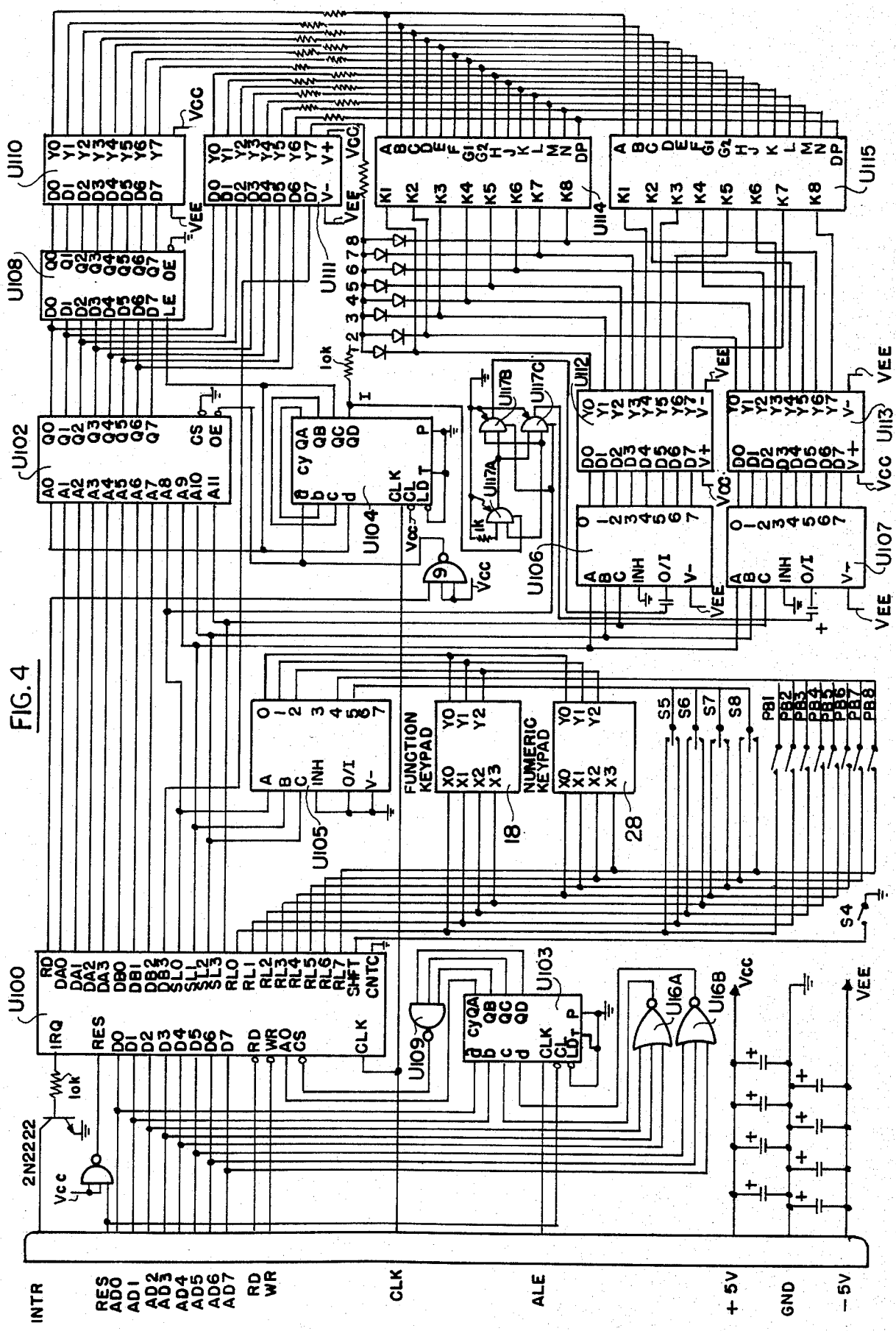
FIG. 4 is a logic diagram of a display and key pads and switches included in the system of FIG. 2.

The circuit of FIG. 4 is the display circuit for the system, and it contains all the elements necessary to read the switches and key pads, and produce the alphanumeric display and to light the indicators within. the pushbutton switches on the front panel. Specifically, FIG. 4 is the circuitry contained in and associated with display block 26, function key pad 18, numeric key pad 28, switches S5–S8, switches PB1–PB8 and port 30 of FIG. 2.

Integrated circuit U100 of FIG. 4 is a display and keyboard recognition chip, and it includes registers which contain the information being displayed and which cycles the information to the display 26 for refreshing purposes. The integrated circuit U100 also contains a matrix for selecting the key pads 18 and 28, and for selecting the switches S4–S8 and PB1–PB8. Integrated circuit U100 may be of the type designated 8279.

Integrated circuit U100 is connected to the microprocessor U1 of FIG. 3 through the eight data lines D0–D7. These are bidirectional lines, and the microprocessor sending data to integrated circuit U100, and also receiving data from integrated circuit U100 over the lines. When the microprocessor sends data to integrated circuit U100, the integrated circuit places data into the alphanumeric display, and when the microprocessor reads data from the integrated circuit U100, the data read reflects the status of the pushbuttoms PB1–PB8, the toggle switches S4–S8, and the key pads 18 and 28. The determination as to whether the integrated circuit U100 is to receive data from the microprocessor or is to send data to the microprocessor is determined by the lines RD and WR. When the line RD is low, the microprocessor receives data from the integrated circuit U100, and when the line WR is low, the ricroprocessor supplies data to the integrated circuit.

The determination as to whether the integrated circuit U100 is to receive data from the microprocessor, or is to supply data to the microprocessor, is made by integrated circuit U103, and logic elements U16A, U16B and U109. These latter elements are contained in an address decoding network which determines when the integrated circuit U100 is to be selected Integrated circuit U103 is actually a counter, but is used as a 4-bit latch to latch the address, because the address comes from the same bus as the data. The ALE signal from the microprocessor is low during the first half of a command interval so that the address signals may be received, and it goes high during the second half of the interval, at which time the bus is available for data, with the addresses being latched during the latter interval. This means that the proper address will select the integrated circuit U100, and the integrated circuit will remain selected for the duration of the command interval. Latch U103 may be of the type designated 74LS161.

The data from integrated circuit U100 which goes to the alphanumeric display is carried by the lines DA0, DA1, DA2, DA3, DB0, DB1, DB2 and DB3. The display, however, requires fourteen bits per character because it is a fourteen segment display, and therefore fourteen segments have to be energized. Since the integrated circuit U100 produces a character which has only seven bits, some means must be provided to convert the seven bit character into a fourteen segment display signal. This is accomplished by a programmable read-only memory U102. The information stored in memory U102 is such that when the seven bit character is presented to its address input, the data which will be found at the selected address is seven bits of the fourteen bits which are to display the character. The circuitry is such that when input A0 of PROM U102 is low, seven of the fourteen segment signals appear at the output Q0–Q7 of the memory. Moreover, when input A0 is high, the other seven segment signals appear at the output of the PROM U102.

Integrated circuit U108 serves as a latch, and the system is such that the first seven segment signals produced by the PROM U102 when A0 is low are latched in the latch U108, and when the second seven segment signals are produced at the outputs of PROM U102, these outputs are applied directly to integrated circuit U111, and the first seven segment signals are supplied at the same time by latch U108 to integrated circuit U110. Accordingly, when the second seven bits of the segment character are stored in integrated circuit U111, the first seven bits are stored in integrated circuit U110, so that all fourteen bits are now present, and are applied through current limiting resistors to the display chips U114 and U115.

The characters displayed by display chips U114 and U115 are presented on a time division multiplex scheme. When the fourteen bits are first applied to the two integrated circuits U114 and U115, K1 of display chip U114 is high, so that its segments are activated. When the bits are applied for the second time, the input K1 of U115 is high so that it is activated. In this way, U114 forms the first character of the display and U115 forms the ninth character of the display. The operation continues with U114 and U115 successively forming the second and eighth characters, the third and seventh characters, and so on.

PROM U102 may be of the type designated 2732. Latch 108 may be of the type designated 74LS373. Integrated circuits U110 and U111 are segment drivers of the type designated UDN2580A.

As mentioned above, PROM U102 is double acting, and it outputs the first eight segment signals and it then outputs the remaining seven segment signals. The first eight segment signals are latched in the latch U108, and then all fifteen segment signals are applied to the segment drivers U110 and U111 together. The display chips U114 and U115 are eight character displays which, together, make up the sixteen character display 26 of FIG. 1. These display chips may be of the type designated MAN2815.

While the integrated circuits U110 and U111 constitute the segment drivers for the displays U114 and U115, integrated circuits U112 and U113 constitute the character drivers for the display units. The integrated circuits U112 and U113 may be of the type designated ULN2811A. Integrated circuits U106 and U107 serve as decoders, and may be of the type designated CD4051B. Integrated circuits U106 and U107 serve to decode the output signals from integrated circuit U100 into character select signals for the character drivers U112 and U113.

Specifically, the cathode drivers for the display units U114 and U115 are the integrated circuits U112 and U113 which receive their data from multiplexers U106 and U107. The integrated circuits U106 and U107 are driven from the scan lines of the display integrated circuit U100 which are designated SL0, SL1, SL2 and SL3, and which have the encoded character position for the particular character whose data is being produced by the DA0–DA3 and DB0–DB3 output. Then, under the control of signals SL0–SL3 of integrated circuit U100, decoders U106 and U107 decode the signals and drive the appropriate character cathode through the drivers U112 and U113.

The O/I inputs of the integrated circuits U106 and U107 are capacitively driven, so that if the multiplexing should inadvertently stop, the display will be turned off, rather than to display one particular character which could cause burn-out. That is to say, the drivers U112 and U113 can only work in an active mode.

It will be noted that fifteen bits are available from integrated circuits U110 and U111, of which only fourteen are needed to form the characters in display units U114 and U115. The other bit is used to drive eight LEDs which are designated 1–8 which are located in the pushbutton switches on the front panel. These LEDs are controlled by the microprocessor just as if they were a fifteenth segment in the display.

A further decoder U105 serves to decode the signals from integrated circuit U100 into Y select signals for the key pads 18 and 28 (Y0, Y1 and Y2), and into select signals form switches S5–S8, and pushbutton switches PB1–PB8.

Part of the alternating current drive to the multiplexers U106 and U107 are logic elements U117A, U117B and U117C which for part of a power driver to drive the AC coupling circuit. U104 which actually is a counter is used as a shift register to shift the timing pulse which comes out of integrated circuit U100 which is a display blanking pulse that occurs between characters. The blanking pulse appears on the signal line RD, and it goes into one input of U9 and then into a parallel load input of U104, and it is shifted through U104 to provide timing for integrated circuits U102 and U108, so that the first seven segments of information that come out of integrated circuit U102 can be latched into U108, and so that the second seven segments out of U102 can be fed to U111.

The command which inputs keys and key pad information and switch information enters integrated circuit U100 on lines RL0–RL7. These lines are input lines to integrated circuit U100 which describe the position of the switches. However, the same scan lines that scan the display are used to time division multiplex the keys of the key pads 18 and 28, so that a total of sixty-four keys can be placed on eight inputs. Integrated circuit U105 is the decoder for the scan lines, and it decodes into five possible times when switch conditions can be input to the integrated circuit U100. The outputs from decoder U105 are placed on one side of the function key pad matrix 18, and on the one of the numeric key pad matrix 28, and are fed to toggle switches S5–S8, and to pushbutton switches PB1–PB8. Then, when each individual line is energized, the keys which are connected between the line and RL0–RL7 can be read.

Switch S4 is the shift key, and when a character is input the integrated circuit U100 will make note of whether the shift key was closed at that time or not.

Figure 5:
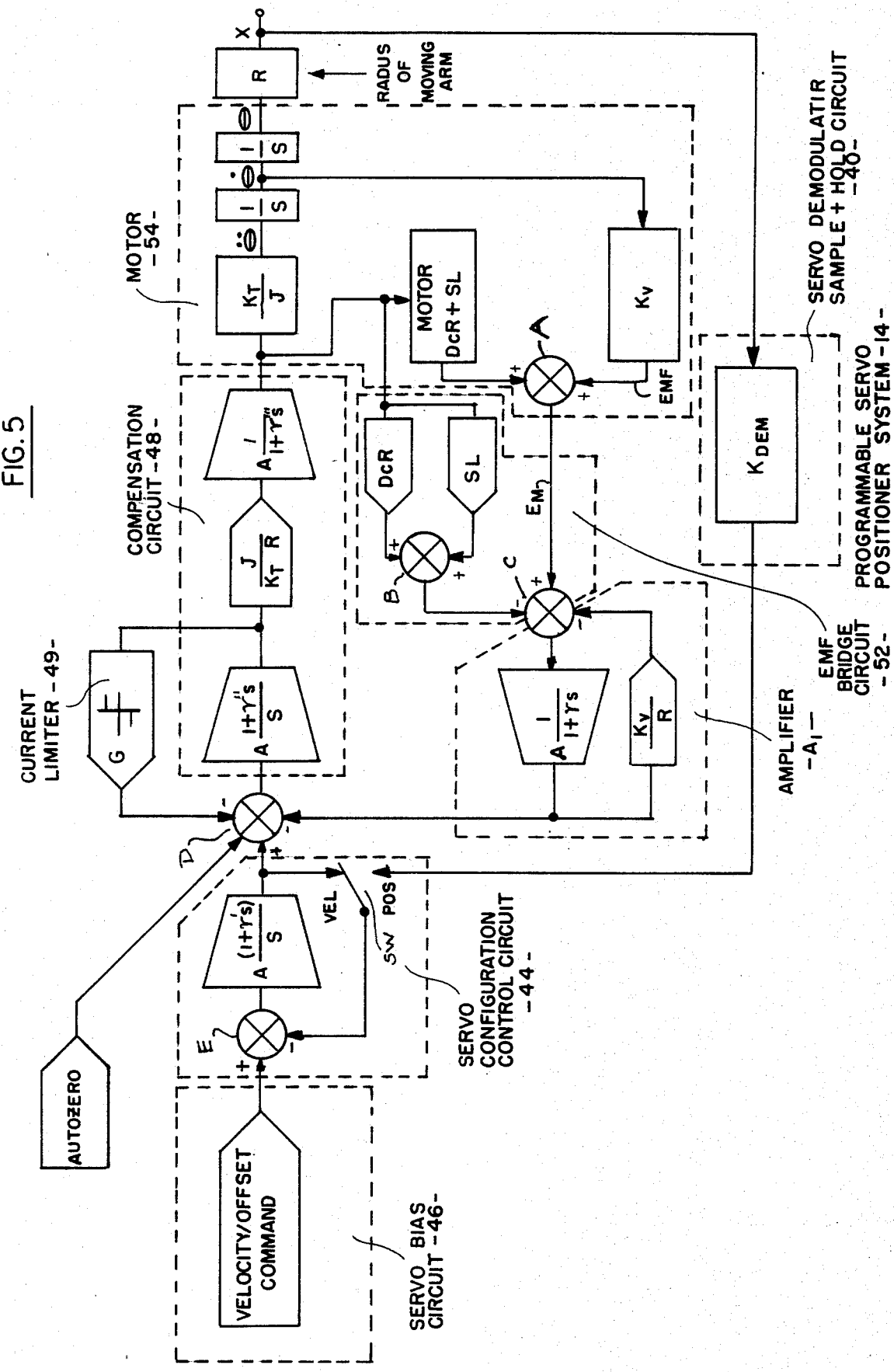
FIG. 5 is a functional diagram of a programmable servo positioner sub-system included in the system of FIG. 2.

As mentioned above, FIG. 5 is a functional diagram of the programmable servo positioner sub-system which is included in the system of FIG. 2. Specifically, FIG. 5 is a block diagram of the operation of the arm moving servo mechanism of the overall system. The block diagram is written in Laplace transform notation.

Block 54 is a representation of motor 54 which moves the arm of the servo writer. Block 54 includes a block designated $^KT/J$, which is a term representing the torque constant of the motor divided by the intertia of the moving system. The input to block $^KT/J$ is a current, and when the current is multiplied by the torque constant ($K_T$) and divided by the intertia (J), it produces an acceleration $\ddot{\theta}$. When the acceleration is integrated, as indicated by the first block 1/S, the integrated acceleration is the velocity $\dot{\theta}$ (where S is the Laplace operator). When the velocity, in turn, is integrated by the same Laplace operator, as indicated by the second block 1/S, the result is an angular position term $\theta$.

Just outside of the motor block 54 is a block designated R, which is the radius of the moving arm of the servo writer. When the angular position $\theta$ is multiplied by the radius (R) of the arm, it gives X which represents the linear displacement of the read/write head of the servo writer.

Back within the block 54, when the coil of the motor moves through the magnetic field, a voltage is produced which is proportional to the velocity, as shown by a block $K_V$. $K_V$ is the voltage constant of the motor. The input to block $K_V$ is the velocity $\dot{\theta}$, and the output of block $K_V$ is an EMF, which is a voltage proportional to velocity, this voltage being applied to a summing junction A.

The input to the $^KT/J$ block is the current in the coil of motor 54. That same current produces a voltage drop which is proportional to the resistance of the coil, as represented by the DcR term in the notor block 54. There is also a voltage drop across the motor coil which is out of phase with DcR, and that is the voltage due to the inductance L of the coil, this voltage being designated by the term SL. The fact that this latter voltage is out of phase with the voltage DcR is indicated by the Laplace operator S. Therefore, the voltage produced across the motor coil as a result of the current flowing in the coil is DcR+SL. This voltage DcR+SL is added to the velocity EMF from the $K_V$ block in the summing junction A, and the voltage output from the summing junction is designated as $E_M$. The voltage $E_M$ is the voltage from the motor 54, and it contains the voltage representing velocity, plus the voltage drop across the resistance and inductance of the motor coil itself. The voltage $E_M$ is applied to a summing junction C in the EMF bridge circuit 52.

A summing junction B is also included in the bridge circuit 52, and this latter junction adds together the voltages DcR and SL. Block DcR in the EMF bridge circuit 52 is a digitally controlled attenuator which multiplies the in phase current in the motor by a digitally controlled amount and places the resulting output voltage into the summing junction B. Likewise, block SL in the EMF bridge circuit 52 is a digitally controlled attenuator which multiplies the out-of-phase motor current by a digitally controlled amount, and applies the resulting voltage to summing junction B.

The output of summing junction B, which is the sum of the voltages DcR and SL, is subtracted from the voltage $E_M$ in summing junction C. The result of these operations is that motor 54 causes the voltages DcR and SL to be added to the back EMF, and bridge circuit 52 serves to subtract them back out again. Therefore, all that is left in summing junction C is merely the EMF term. The purpose of the EMF bridge circuit 52 is to cancel out the voltage due to current flow in the motor coil, and leave only the voltage due to the velocity of the motor. Accordingly, only the velocity voltage remains in the summing junction C.

Amplifier $A_1$ is a feedback amplifier. The forward function of the amplifier is represented by a block designated $A1/1+\tau s$; where A represents a constant gain, and $1+\tau s$ is a roll-off factor so that high frequencies beyond an amount represented by the value of $\tau$ will not pass through the amplifier.

The feedback of the amplifier is digitally controlled, and is represented by the block $^KV/R$; where $^KV/R$ is set by the microprocessor, $K_V$ being the voltage constant of the motor, and R being the radius of the arm of the servo writer. The result of the feedback in amplifier $A_1$ is that for all frequencies below the frequency range limited by $\tau_s$ in the forward path, the output of amplifier $A_1$ is the EMF input of the amplifier multiplied by the radius R of the arm of the servo writer, and divided by the voltage constant $K_V$ of the motor. This obtains because the $^KV/R$ term is in the feedback path of the amplifier. Accordingly, the output of amplifier $A_1$ is proportional to the actual linear velocity of the head, because the EMF input term is proportional to angular velocity and to the voltage constant of the motor. Amplifier $A_1$ compensates both for the voltage constant $K_V$ of the motor and for the radius R of the arm, so that the output of amplifier $A_1$ is a voltage which is proportional to the actual linear velocity of the head. The amplifier output is fed to a summing junction D.

The system described above constitutes the feedback portion of the main velocity control loop. The forward portion is the compensation circuit 48. The first element in the compensation circuit is an amplifier having a gain represented by $A1+\tau s''/S$. The result is that the amplifier has a gain which has a value A at zero frequency, and which falls off as frequency increases until it reaches a point which is defined by $\tau''$, and which is then flat from that point onward as the frequency increases. The amplifier feeds into a digitally controlled attenuator $J/K_tR$. The output of that block is fed to a further amplifier having a gain represented by A $1/1+\tau''s$. The latter amplifier determines the maximum frequency of the forward part of the loop.

Therefore, the effect of the compensation circuit 48 is that the digitally controlled attenuator multiplies the forward signals by the inverse of a term in the motor block 54. As shown in motor block 54, there is a term $^KT/J$ which is subsequently multiplied by R to provide $^KTR/J$; and in the compensation circuit 48 there is a term $J/K_TR$. Accordingly, when the two terms are multiplied together the result is 1. Therefore, the purpose of the $J/K_TR$ block in the compensation circuit 48 is to compensate for the $^KT/J$ term which appears in the motor 54 and the radius R of the moving arm of the servowriter. The compensation circuit 48 serves therefore to normalize the circuit so that the input to the compensation circuit 48 will be a normalized voltage which is to produce a standard acceleration and velocity and linear position change at the read/write head for all servo mechanism motors to which the system might be connected.

The current limiter block 49 is a non-linear feedback element which takes the normalized voltage and establishes an acceleration limit. Since the current limiter block is connected before the $J/K_TR$ normalization block, the current limiter may be adjusted to 1imitt the output of the amplifier $A_1$ and the compensation circuit 48 to a value which produces a particular acceleration at the read/write head of the servowriter, and because of the fact that the circuit has been normalized by placing the proper digital value in $J/K_TR$, the voltage limit establishes will result in a normal acceleration limit at the read/write head. The system thus far described is a velocity servo, and any input to the summing junction D will result in a normalized velocity at the read/write head of the servowriter.

The block 40 is designated the servo demodulator sample and hold circuit. This circuit takes the input from the read/write head of the servowriter which reads the bits recorded on the servo track, and converts these bits into a voltage which is proportional to the distance that the head is displaced from the center of the track.

The servo configuration control circuit 44 includes a switch SW which is actually a computer controlled switch. This switch allows the entire system of FIG. 5 to be either a position servo or a velocity servo. If the switch is in the POS position, then the feedback from the sample and hold circuit 40 is fed back to the summing junction E, and the whole system functions as a position servo. For that mode, the input from the servo bias circuit 46 is a position command, and the servowriter head is zeroed on the track or moved off the track by an amount proportional to the signal from circuit 46. The action of the rest of the system of FIG. 5 is to servo the head and force it to remain in a position which is proportional to the bias that is introduced from the velocity/offset command in servo bias circuit 46.

If the switch SW of the servo configuration control circuit 44 is placed in the VEL position, then the position feedback from servo demodulator sample and hold circuit 40 is disconnected, and the elements within the configuration control circuit 44 are essentially short-circuited. This means that the velocity and offset command signal from servo bias circuit is passed right through to the summing junction D. The system of FIG. 5 now operates as a velocity servo, and the velocity/offset command from servo bias circuit 46 results in a constant velocity at the output of the system rather than a constant position.

The auto zero function, represented by the block in the upper left-hand corner of FIG. 5, occurs when the computer puts in a constant from that block. This constant zeros the entire system automatically, so that there is no need to adjust the system for zero manually with a trim potentiometer. The system is subject to drift during the operation due to thermal changes and motor heating, and it must be recalibrated frequently during operation. The auto zero is a computer control function which automatically recalibrates the zero of the system periodically during operation.

It has been the prior art practice in writing the servo information in the disc, mechanically to attach the moving arm of a servowriter on which a write head is positioned to an external positioning system which mechanically forces the head into predetermined positions. The head is usually positioned by means of a servo mechanism that responds to a laser interferometer. The disc drive is usually mounted on a four ton granite slab. The laser interferometer has a corner mirror attached to the arm of the servowriter, and the servo mechanism positions the arm mechanically. The servo information is written on the disc by positioning the arm first at its innermost position and writing, for example, the odd bursts in the innermost servo track. The arm is then moved outwardly a small amount, and the even servo bursts are then written in the next servo track. The arm is then moved outwardly an additional small amount, and the odd servo bursts are written in the next servo track, and so on. The aforesaid operation is usually carried out under computer control. However, in all instances in the prior art, the servo bursts are written on the disc by mechanically moving the arm of the servowriter.

Figure 6:
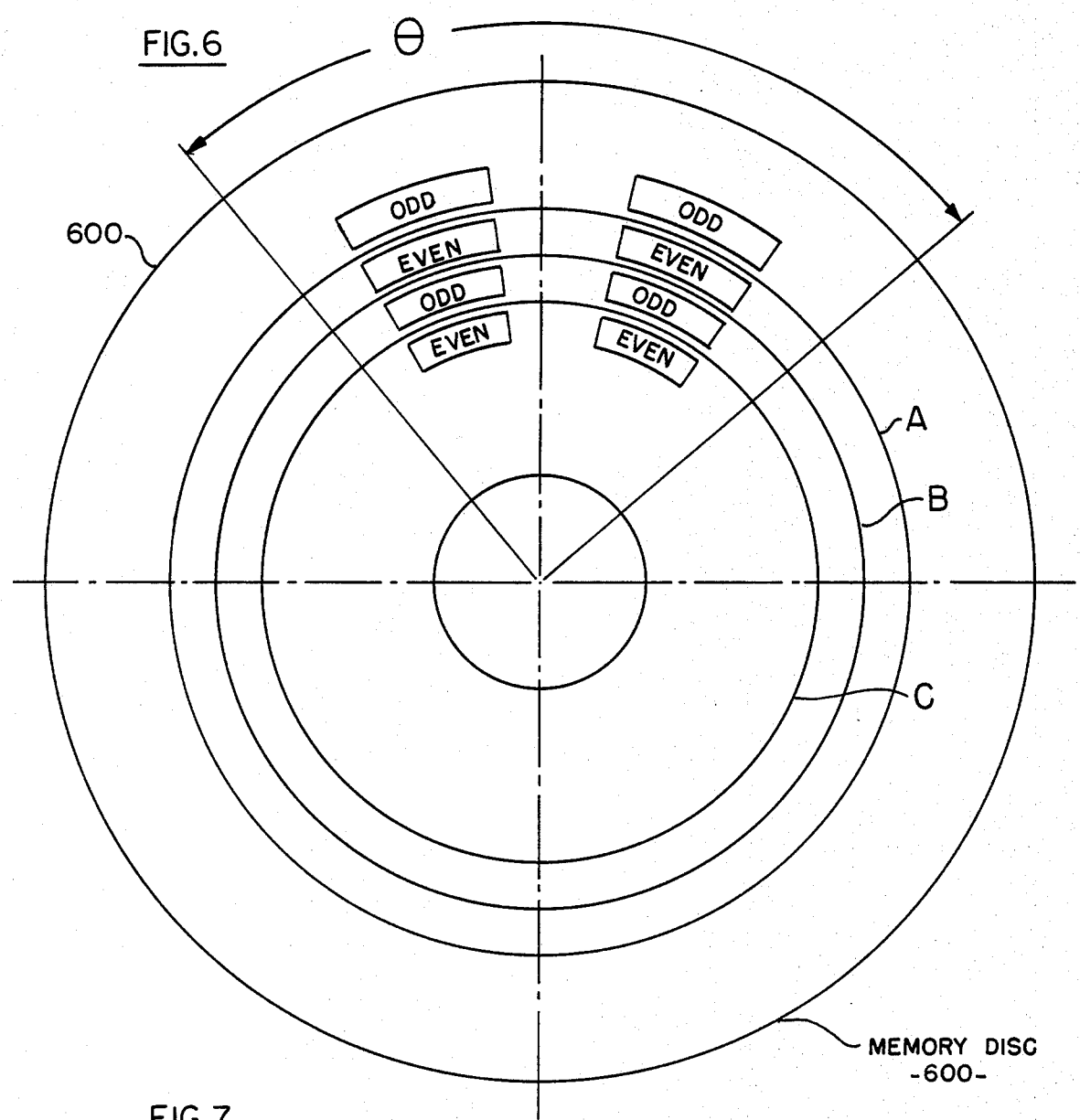

FIG. 6 is a schematic representation of a memory disc 600 in a disc drive having embedded servo tracks written on its surface. The embedded servo tracks are not continuous tracks, but consist of bursts of odd and even servo information written between data sectors on each data track. As shown in FIG. 6, the bursts of servo information are written on the disc between the data tracks, such as data tracks A, B, and C. The head reads data during the sector data time, and it reads servo information between successive data times. The servo information is sampled when read and held during the sector data times so that a continuous servo control may be exerted on the head.

Figure 7:
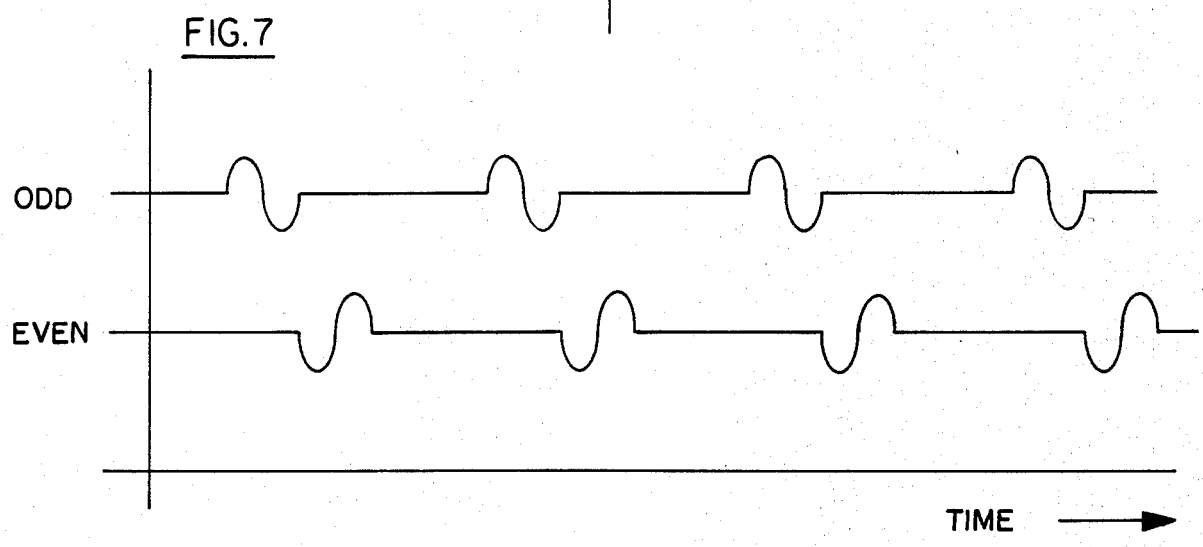

The servo bursts are known as bursts of even and odd servo information. The resulting odd servo signal is shown, for example, in the upper curve (ODD) of FIG. 7, and the even servo signal is shwon by the lower curve (EVEN).

The servo bursts in each servo track extend in a discontinuous manner all the way around the disc, with these bursts occurring, in each instance, between successive data sectors. In a typical disc drive there may be 32 servo bursts in each servo track. During normal operation of the drive, the head reads the information in each data track and, in so doing, straddles the adjacent ODD and EVEN servo tracks. The resulting servo signals are used in the disc drive to maintain the head on the data tracks.

In accordance with the prior art practice, the embedded servo tracks are written on disc 600 in FIG. 6 by the use of a mechanical external positioner. The external positioner in the prior art is controlled by a servo mechanism which usually incorporates a laser interferometer. The prior art mechancial positioning mechanism is complex and is difficult to operate. In the system of the present invention the need for the mechanical positioner is obviated, and the servo bursts are written in the servo tracks electrically under the control of the microprocessor system described above.

In describing the operation of the invention, a segment $\theta$ of the disc of FIG. 6 will be considered, and although only two sets of servo bursts are shown in FIG. 6, it will be assumed that this section embraces five such sets.

As a first step in writing the servo bursts on the disc 600 of FIG. 6 in accordance with the teaching of the present invention, the arm on which the head is positioned is controlled in a velocity servo mode, and even servo information is written over the entire surface of the disc. This is achieved by first moving the arm to the outer crash stop and then causing the arm to move radially a distance less than a data track width for each revolution of the disc. The result is that the even servo information is written over the entire surface of the disc. Segment $\theta$ is shown in the Mercater projection of FIG. 8, with the disc being magnetized by north poles (N) and south poles (S) in the manner shown in FIG. 8, this magnetization corresponding to the writing of the even servo information over the entire surface of the disc.

The foregoing is achieved by first positioning the arm at the outer radius of disc 600, as mentioned above, by driving the arm against the crash stop at the outer radius to define its position. Then, the velocity of the arm is controlled so that the head describes a spiral as it is moved from the outer radius to the inner radius of the disc. The pitch of the spiral is controlled by the microprocessor system described above, so that for each revolution of the disc the head moves radially inwardly a distance less than one track width but greater than zero. In this manner, even servo information is written over the entire surface of the disc, as shown schematically in FIG. 8.

As the next step, the arm is again driven against the outer crash stop, and the head is caused to write ODD servo information in Sectors 1 and 3, and shown in the Mercater projection of FIG. 9, and in corresponding sectors in successive segments around the disc, the ODD servo information being so written in the outer-track of the disc. The width of the ODD servo information so written in selected sectors around the outer track is equivalent to the width of the head.

As a next step in the operation, the head is caused to servo on the boundary between the ODD servo information in Sectors 1 and 3, and the EVEN servo information previously written over the entire surface of the disc. When so positioned, the head will be caused to write ODD servo information in Sectors 2 and 4, which is offset half a track width from the odd servo information previously written in Sectors 1 and 3. This is because the head is no longer positioned against the outer crash stop, but instead has been servoed on the boundary between the ODD servo information written in Sectors 1 and 3, and the EVEN servo information written over the entire remaining surface of the disc. During this initial step, no information is written into Section 5.

The head is then servoed on the boundary between the odd servo information in Sections 2 and 4, and the even servo information on the disc, and odd servo information is written in Sectors 1 and 3 directly adjacent to the odd servo information previously written in these sectors. This operation is continued around the entire disc as the arm progresses from the outer crash stop to the inner crash stop. The microprocesosr in the system keeps track of the number of steps it takes the arm to proceed from the outer crash stop to the inner crash stop. The microprocessor will then compare the number of steps with the number of tracks actually required on the disc.

If the number of actual steps is different from the number of tracks actually required, a particular bias, of an amount determined by the microprocessor, will be introduced so that on the next operation the number of steps will exactly equal the number of tracks required on the disc.

Before carrying out the next operation, the disc is completely erased, and the entire preceding operation is repeated with the added bias. During the second operation the head does not servo exactly on the boundary between the odd an even servo information, but is offset slightly due to the bias introduced by the microprocessor so that the number of steps taken from the outer radius to the inner radius will be exactly equal to the number of servo tracks to be written on the disc.

During the second operation, the head is caused to write odd servo information in Sector 5 when the arm is against the outer crash stop. When the arm is one-half a track away from the outer crash stop, the head does not write anything in Sector 5. When the arm is a full track away from the outer crash stop, the head is caused to write EVEN servo information in Sector 5. This continues as the arm moves from the outer crash stop to the inner crash stop, so that ODD and EVEN servo information is written in successive tracks in Section 5, as shown in FIG. 9.

The sectors 1–4 are the scratch sectors, and they may be positioned in the data portion of the information to be written on the disc, whereas Sector 5 is positioned in the normal position for the embedded servo information, between successive data sectors. Accordingly, each Sector 5 of FIG. 9 around the disc occurs between the data sectors on each data track. As the data is subsequently written on the disc, it is written over the scratch Sectors 1–3, and the head is not responsive to any residual servo information in those sectors. The head responds only to the ODD/EVEN servo information written in each Sector 5 around the disc to be servoed on the data tracks.

If the servo information is to be written on a disc dedicated to servo tracks, it is merely necessary to servo the head on the Sector 5 servo information, and cause it to read the servo information and to supply the information to another head so as to cause the latter head to write the servo information continuously on another disc.

Before the servo tracks are written on disc 600 of FIG. 6, it is first necessary to write a master clock track on the disc by a separate head which serves as a timing reference for the entire operation. The first four pushbutton switches PB1, PB2, PB3 and PB4 on the front panel of FIG. 1 control a clock writer which is part of the servowriter of the invention, and which, may be similar to the clock writer disclosed in Pat. No. 4,131,920.

The pushbutton switches PB5–PB8 on the front panel of FIG. 1 control the servo writing process described above. That is, pushbutton PB5 initiates the action which causes the EVEN servo information to be written over the entire surface of disc 600; pushbutton PB6 initiates the first calibration operation on the disc during which the ODD servo information bursts are written on successive tracks. Pushbutton PB7 initiates the second final operation by which the servo information is actually written on the tracks for subsequent use. Pushbutton switch PB8 causes the system to go back and verify the servo information that has been written on the disc.

The connector 31 provides connections to the motor which moves the arm of the servo head; connector 29 provides connections to the servo head itself; and connector 27 provides connections to the separate clock head.

The function key pad 18 and the numeric key pad 28 on the front panel of FIG. 1 serve to enter the various parameters of FIG. 5, such as $K_T$, R, $K_V$ into the microprocessor system.

When the key labelled "Enter Clock Parameters" of the function key pad 18 is depresed, the alphanumeric display 26 will prompt the operator to enter information such as the number of bits in the clock track, the desired number of sectors, etc., and the operator will respond to each prompt by entering the appropriate numbers by operation of the numeric key pad 28.

When the key labelled "Enter Servo Parameters" of the function key pad 18 is operated, then the display 26 will prompt the operator to enter the values of $K_T$, $K_V$ and R; as well as the motor resistance $D_CR$ and the motor inductance SL into the system by operation of the numeric key pad 28.

When the key labelled "Enter Pattern Parameters" of the function key pad 18 is depressed, the operator will be prompted by display 26 to enter the particular dibit pattern used by the disc drive memory being processed, this being achieved by operation of the numeric key pad 28.

When the key labelled "Enter Spin Parameter" of the function key pad 18 is depressed, the operator will be prompted by display 26 to enter, by means of the numeric key pad 28, the spindle r.p.m. the disc drive memory being processed.

When the key labelled "Load Stored Parameter" of function key pad is operated, the operator can call up parameters stored in the PROMs of the system. For example, all information relating to the different disc drive mechanisms to be processed by the system may be stored in the PROMs, and all information relating to any particular disc drive can then be called by operating a corresponding predetermined number key of the numeric key pad 28.

The "Go monitor" key of the function key pad 18 is used to provide access to the microprocessor system from an external CRT terminal connected to connector 27. This permits programs to be written and other functions to be carried out which are not normally available from the front panel controls of FIG. 1.

The "Clear and Reset" key of the function key pad is used to clear the display 26 in the event an incorrect memory has been made, and operation of this key also serves to reset the microprocessor. The "Display Errors" key allows the operator to verify the servo tracks that have already been written.

With respect to switches S5-S7, S5 is the switch is causes power to be applied to the disc drive being processed, S6 is the switch which turns the motor which spins the disc on or off, S7 starts a microprocessor controlled automatic sequence of all the steps individually controlled by pushbutton switches PB1-PB8.

The invention provides, therefore, a servowriter system for writing servo tracks on the disc of a disc drive memory without the aid of a mechanical head positioner.

It will be appreciated that while a particular embodiment of the invention has been shown and described, modifications may be made, and it is intended in the following claims to cover all modifications which come within the true spirit and scope of the invention.

What is claimed is:

1. A servowriter system for writing odd and even servo information in servo tracks on a magentic disc, said system including: an electromagnetic servo head mounted on a movable arm for writing the odd and even servo information in the servo tracks; a motor for driving the movable arm so as to position the servo head; a servo generator connected to said servo head for introducing servo information to said head to be written on the disc; and a microprocessor control unit connected to said servo generator and to said servo positioner system to cause said servo positioner system to enable said servo generator to cause said servo head to write odd and even servo information in selected tracks on the disc while positioned on the boundaries of odd and even servo information previously written on said disc.

2. The servowriter system defined in claim 1, in which said microprocessor control unit causes said programable servo positioner system initially to drive the arm of said servo head to the outer radius of said disc and subsequently to cause the servo head to move toward the inner radius of said disc under velocity servo control, and simultaneously causes said servo pattern generator to introduce even servo information to the servo head to be written over the entire surface of said disc.

3. The servowriter system defined in claim 2, in which said microprocessor control unit then causes said servo positioner system to drive the arm of said servo head to the outer radius of said disc, and then causes said servo generator to introduce odd servo information to said servo head to be written in selected sectors around said disc in a track adjacent to said outer radius.

4. The servowriter system defined in claim 3, in which said microprocessor control unit causes said servo positioner system to position the servo head on boundaries between the odd and even servo information on the disc, and said . servo positioner system includes position servo circuitry for maintaining the servo head on said boundaries, and in which said microprocessor control unit causes said servo generator to introduce odd servo information to said servo head to be written in successive tracks extending from the outer radius to the inner radius of the disc.

5. The servowriter system defined in claim 4, in which said microprocessor unit determines the number of said successive tracks on which the odd servo information was written, and said microprocessor unit introduces a bias control signal to said positioner system to change the number of said successive tracks to be subsequently established by said servo positioner system so as to correspond to a predetermined number of tracks.

6. The servowriter system defined in claim 5, in which said microprocessor control unit again drives the arm of said servo head to the outer radius of the disc and again causes the servo head to move toward the inner radius of said disc under velocity servo control by said servo positioner system, and in which said microprocessor control unit causes said servo generator to introduce even servo information to the servo head again to be written over the entire surface of said disc.

7. The servowriter system defined in claim 6, in which said microprocessor control unit again causes said programmable servo positioner to drive said arm to the outer radius of the disc, and said microprocesosr control unit again causes said servo generator to introduce odd servo information to said servo head to be written in selected sectors around said disc in the track adjacent to said outer radius.

8. The servowriter system defined in claim 7, in which said microprocessor control unit then causes said servo positioner system to position the servo head on the boundaries between the odd and even servo information on the disc, and in which said servo positioner system includes position servo circuitry for maintaining the servo head on the boundaries, and in which said microprocessor control unit then causes said servo generator to introduce odd servo information to said servo head to be written in successive tracks from the outer to the inner radius of the disc.

9. The servowriter system defined in claim 8, in whcih said microprocessor control unit controls the servo generator to cause the servo head to write odd and even servo information in successive ones of said tracks in selected sectors around the disc.

10. A servowriter system for writing odd and even servo information in servo tracks on a magnetic disc, said system including: an electromagnetic servo head mounted on a movable arm for writing the odd and even servo information in the servo tracks on the magnetic disc; a motor for driving the movable arm so as to position the servo head with respect to the disc; a microprocessor control unit; a programmable servo generator connected to said microprocessor control unit and to said servo head for introducing the odd and even servo information to said servo head to be written in the servo tracks on said disc; and a programmable servo positioner system connected to said microprocessor and to said motor for controlling the position of said servo head.

11. The servowriter system defined in claim 10, and which includes an electromagnetic clock head for writing clock signals in a closed format on a clock track on the disc; and a clock writer circuit connected to said microprocessor control unit and to said clock head for introducing clock information to said clock head to be written on the disc.

12. The servowriter system defined in claim 10, and which includes first control means connected to said programmable servo positioner system and to said servo generator for causing said positioner system initially to drive the arm of said servo head to the outer radius of said disc and for then causing said servo head to move toward the inner radius of said disc under velocity servo control, and for causing said servo generator to introduce even servo information to the servo head to be written over the entire surface of said disc.

13. The servowriter system defined in claim 12, and which includes second control means connected to said programmable servo positioner system and to said servo generator for causing said positioner system to drive the arm to the outer radius, and for causing said servo generator to introduce odd servo information to said servo head to be written in selected sectors around the disc on a track adjacent to said outer radius.

14. The servowriter system defined in claim 13, in which said servo positioner system includes circuit means for positioning the servo head on the boundaries between the odd and even servo information on the disc so as to enable said servo generator to introduce odd servo information to said servo head to be written in successive tracks from the outer radius to the inner radius of the disc.

15. The servowriter system defined in claim 14, in which said servo positioner system includes circuit means enabling said microprocessor control unit to determine the number of said successive tracks on which the odd servo information was written, and said servo positioner system includes further circuit means responsive to a control signal from said microprocessor control unit to change the number of said successive tracks to be subsequently established by said servo positioner system so as to correspond to a predetermined number of tracks.

16. The servowriter system defined in claim 15, and which includes third control means connected to said programmable servo positioner system and to said servo generator for causing said servo positioner system again to drive the arm of said servo head to the outer radius of said disc and for then causing said servo head to move toward the inner radius of said disc under velocity servo control, and for again causing said servo generator to introduce even servo information to the servo head to be written on the entire surface of the disc.

17. The servowriter system defined in claim 15, and which includes fourth control means connected to said programmable servo positioner system and to said servo generator for causing said positioner system again to drive the arm of the servo head to the outer radius of the disc, and for again causing said servo generator to introduce odd servo information to said servo head to be written in selected sectors around said disc on a track adjacent to said outer radius.

18. The servowriter system defined in claim 17, in which said servo positioner system includes circuit means for again positioning said servo head on the boundaries between the odd servo information and the even servo information on the disc, so as to enable said servo generator to introduce odd servo information to said servo head to be written in successive tracks on the disc from the outer radius to the inner radius.

19. The servowriter system defined in claim 18, in which said servo positioner system includes circuit means for enabling said servo generator to write odd and even servo information in successive ones of said tracks in selected sectors around the disc as the servo head is positioned on boundaries between the previously written odd and even servo information.

20. A method for writing odd and even servo information in servo tracks on a magnetic disc having an outer radius and an inner radius, which method comprises causing a servo head to write odd and even servo information in selected tracks on the disc while positioned on the boundaries of odd and even servo information previously written on the disc.

21. The method defined in claim 20, and which includes the steps of initially driving the servo head to the outer radius of the disc and subsequently causing the servo head to move towards the inner radius of the disc, and simultaneously causing the servo head to write even servo information in a predetermined number of tracks over the entire surface of the disc.

22. The method defined in claim 21, and which includes the steps of subsequently driving the servo head to the outer radius of the disc, and subsequently causing the servo head to write odd servo information in selected sectors around the disc in a track adjacent to the outer radius of the disc.

23. The method defined in claim 22, and which includes the steps of positioning the servo head on the boundaries between odd and even servo information on the disc, and then causing the servo head to write odd servo information in successive tracks extending from the outer radius to the inner radius of the disc.

24. The method defined in claim 23, and which includes the steps of again driving the servo head to the outer radius of the disc, and again subsequently causing the servo head to move towards the inner radius of the disc and simultaneously causing the servo head to write even servo information in a different predetermined number of tracks over the entire surface of the disc.

25. The method defined in claim 24, and which includes the steps of again driving the servo head to the outer radius of the disc, and subsequently causing the servo head to write odd servo information in selected sectors around the disc in the track adjacent to the outer radius of the disc.

26. The method defined in claim 25, and which includes the steps of then positioning the servo head on the boundaries between odd and even servo information on the disc, and then causing the servo head to write odd servo information in successive tracks extending from the outer radius to the inner radius of the disc.

27. The method defined in claim 25, and which includes the step of causing the servo head to write odd and even servo information in selected sectors in successive tracks on the disc.

* * * * *